United States Patent [19]

Frame

[11] 4,374,042
[45] * Feb. 15, 1983

[54] METHOD OF REACTIVATING A CATALYTIC COMPOSITE OF A CARRIER MATERIAL AND A MERCAPTAN OXIDATION CATALYST

[75] Inventor: Robert R. Frame, Glenview, Ill.

[73] Assignee: UOP Inc., Des Plaines, Ill.

[*] Notice: The portion of the term of this patent subsequent to Dec. 29, 1998, has been disclaimed.

[21] Appl. No.: 257,041

[22] Filed: Apr. 24, 1981

Related U.S. Application Data

[63] Continuation-in-part of Ser. No. 170,372, Jul. 21, 1980, Pat. No. 4,308,169, which is a continuation-in-part of Ser. No. 973,303, Dec. 26, 1978, Pat. No. 4,213,877.

[51] Int. Cl.³ .................... B01J 31/40; C10G 19/02; C10G 19/08; C10G 29/00
[52] U.S. Cl. .................... 252/412; 208/206; 208/207
[58] Field of Search .................... 252/412, 413, 420; 208/206, 207

[56] References Cited

U.S. PATENT DOCUMENTS

| | | | |
|---|---|---|---|
| 2,918,426 | 12/1959 | Quiquerez et al. | 208/206 |
| 2,966,453 | 12/1960 | Gleim | 208/206 |
| 3,148,156 | 9/1964 | Henry | 252/420 |
| 3,252,892 | 5/1966 | Gleim | 208/206 |
| 3,326,816 | 6/1967 | Urban | 252/413 |
| 3,445,380 | 5/1969 | Urban | 208/206 |
| 3,980,582 | 9/1976 | Anderson, Jr. et al. | 252/428 |
| 4,009,120 | 2/1977 | Hilfman | 252/413 |
| 4,213,877 | 7/1980 | Frame | 252/412 |
| 4,299,729 | 11/1981 | Frame | 252/412 |
| 4,308,169 | 12/1981 | Frame | 252/412 |

Primary Examiner—P. E. Konopka
Attorney, Agent, or Firm—James R. Hoatson, Jr.; Gregory J. Mancuso; William H. Page, II

[57] ABSTRACT

A method of reactivating a mercaptan oxidation catalytic composite of an adsorptive support and a metal chelate comprising contacting the composite with an aqueous solution of a quaternary ammonium compound and a linear ionic compound at a temperature of from about 55° C. to about 175° C.

13 Claims, No Drawings

METHOD OF REACTIVATING A CATALYTIC COMPOSITE OF A CARRIER MATERIAL AND A MERCAPTAN OXIDATION CATALYST

CROSS-REFERENCE TO RELATED APPLICATIONS

This application is a continuation-in-part of my copending application U.S. Ser. No. 170,372, filed on July 21, 1980 and issued as U.S. Pat. No. 4,308,169 on Dec. 29, 1981, which is in turn a continuation-in-part of my application U.S. Ser. No. 973,303, filed on Dec. 26, 1978, issued as U.S. Pat. No. 4,213,877, the teachings of both of which are incorporated herein by reference.

BACKGROUND OF THE INVENTION

Processes for the oxidation and conversion of mercaptans contained in a sour petroleum distillate wherein the distillate is treated in admixture with an oxidizing agent in contact with a metal chelate mercaptan oxidation catalyst at oxidation reaction conditions, have become well known and widely practiced in the petroleum refining industry. Said processes are often advantageously effected in a fixed bed treating system wherein the metal chelate mercaptan oxidation catalyst is adsorbed or impregnated on a solid adsorbent support or carrier material disposed as a fixed bed in a treating column. The sour distillate is typically passed in contact with the catalytic composite in admixture with an oxidizing agent and an aqueous caustic solution. The catalytic composite generally requires periodic reactivation, reactivation being effected in situ, for example, by water-washing at an elevated temperature in accordance with the method of U.S. Pat. No. 3,148,156, or water-washing at an elevated temperature followed by a steam treatment in accordance with the method of U.S. Pat. No. 4,009,120, or sequentially washing the catalytic composite with water, dilute acetic acid and alcohol pursuant to the method of U.S. Pat. No. 3,326,816, the washing in some cases being followed by reimpregnation to re-establish a desired concentration of the metal chelate component of the catalytic composite. In time, depending on the character of the sour petroleum distillate being treated, the catalytic composite will no longer respond to conventional reactivation methods and must be replaced.

Detergents have been disclosed to be useful in the pretreatment of sour hydrocarbon distillates to remove certain surface active materials from the distillate. (U.S. Pat. No. 3,445,380). However, such a use of detergents as a solvent for deleterious constituents of the distillate requires a multiple step treating operation. Further, the detergent acts upon the distillate rather than the catalytic composite.

SUMMARY OF THE INVENTION

This invention provides an improved method of reactivation, particularly with respect to those deactivated catalysts which are no longer suitably reactivated by the more conventional methods. The linear ionic compound and the quaternary ammonium compound of this invention appear to interact to facilitate the disposition of the quaternary ammonium compound on the catalytic composite being reactivated.

In one of its broad aspects, the present invention embodies a method of reactivating a catalytic composite comprising a carrier material and a metal chelate mercaptan oxidation catalyst, which comprises contacting said composite with an aqueous solution of a linear ionic compound and a quaternary ammonium compound at a temperature of from about 55° C. to about 175° C.

In another one of its broad aspects, the present invention embodies a method of reactivating a catalytic composite comprising a carrier material and a metal chelate mercaptan oxidation catalyst, which comprises sequentially contacting said composite first with an aqueous ammoniacal solution of a metal chelate, and thereafter with an aqueous solution of a linear ionic compound and a quaternary ammonium compound solution at a temperature of from about 55° C. to about 175° C.

One of the more specific embodiments of this invention concerns a method of reactivating a catalytic composite comprising an activated charcoal carrier material and a metal phthalocyanine mercaptan oxidation catalyst, which comprises contacting said composite with an aqueous solution of a quaternary ammonium compound and a linear ionic compound at a temperature of from about 55° C. to about 175° C. The quaternary ammonium compound is represented by the structural formula:

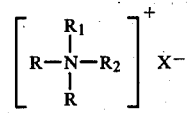

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, $R_2$ is selected from the group consisting of aryl, alkaryl and aralkyl, and X is an anion, for example, chloride, hydroxide, nitrate, nitrite, sulfate, phosphate, citrate, tartrate, and the like. The linear ionic compound comprises a hydrocarbon having from about 9 to about 24 carbon atoms, and a sulfonate group, a sulfate group, or a carboxylate group.

A still more specific embodiment relates to a method which comprises contacting said catalytic composite with an aqueous solution of sodium lauryl sulfate and benzyldimethylalkylammonium hydroxide at a temperature of from about 55° C. to about 175° C., the alkyl substituent of said benzyldimethylalkylammonium hydroxide being a substantially straight chain alkyl radical containing from about 12 to about 18 carbon atoms.

Another more specific embodiment relates to a method which comprises sequentially contacting said catalytic composite first with an aqueous solution comprising from about 0.1 wt. % to about 5 wt. % ammonium hydroxide, from about 0.01 wt. % to about 1 wt. % cobalt phthalocyanine monosulfonate, and from about 0.001 wt. % to about 10 wt. % sodium lauryl sulfate, and thereafter with an aqueous solution of benzyldimethylalkylammonium hydroxide solution at a temperature of from about 55° C. to about 175° C., the alkyl substituent of said benzyldimethylalkylammonium hydroxide being a substantially straight chain alkyl radical containing from about 12 to about 18 carbon atoms.

Other objects and embodiments of this invention will become apparent in the following detailed specification.

DETAILED DESCRIPTION OF THE INVENTION

The carrier material component of the catalytic composite herein contemplated can be any of the well-known materials generally utilized as a catalyst support or carrier material. Preferred materials include the various charcoals produced by the destructive distillation of wood, peat, lignite, nut shells, bones, and other carbonaceous matter, and preferably such charcoals as have been heat treated, or chemically treated, or both, to form a highly porous particle structure of increased adsorbent capacity, and generally defined as activated carbon or charcoal. Said materials also include the naturally occurring clays and silicates, e.g. diatomaceous earth, Fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular material is selected with regard to its stability under conditions of its intended use. For example, in the treatment of a sour petroleum distillate, the carrier material should be insoluble in, and otherwise inert to, the petroleum distillate at the alkaline reaction conditions existing in the treating zone. In the latter case, charcoal, and particularly activated charcoal, is preferred because of its capacity for the metal chelate, especially the metal phthalocyanines, and because of its stability under treating conditions.

The metal chelate component of the catalytic composite can be any of the various metal chelates known to the treating art as effective to catalyze the oxidation of mercaptans contained in a sour petroleum distillate with the formation of polysulfide oxidation products. Said catalysts include the metal compounds of tetrapyridinoporphyrazine described in U.S. Pat. No. 3,980,582, e.g. cobalt tetrapyridinoporphyrazine; porphyrin and metaloporphyrin catalysts as described in U.S. Pat. No. 2,966,453, e.g. cobalt tetraphenylporphyrin sulfonate; corrinoid catalysts as described in U.S. Pat. No. 3,252,892, e.g. cobalt corrin sulfonate; chelate organometallic catalysts such as described in U.S. Pat. No. 2,918,426, e.g. the condensation product of an aminophenol and a metal of Group VIII (e.g., the metal complexes synthesized from 3,3′,4,4′-benzophenonetetracarboxylic dianhydride as described in U.S. Pat. No. 4,243,551); and the like. Metal phthalocyanines are a preferred class of mercaptan oxidation catalysts.

The metal phthalocyanines employed as a mercaptan oxidation catalyst generally include magnesium phthalocyanine, titanium phthalocyanine, hafnium phthalocyanine, vanadium phthalocyanine, tantalum phthalocyanine, molybdenum phthalocyanine, maganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The metal phthalocyanine is most frequently employed as a derivative thereof, the commercially available sulfonated derivatives, e.g. cobalt phthalocyanine monosulfonate, cobalt phthalocyanine disulfonate, or a mixture thereof, being particularly preferred. The sulfonated derivatives may be prepared, e.g. by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The metal chelate mercaptan oxidation catalysts, particularly the metal phthalocyanines, are readily adsorbed or impregnated on the support or carrier material to produce the catalytic composite herein contemplated. In general, up to about 25 wt. % metal phthalocyanine can be adsorbed or impregnated on the support and still form a stable catalytic composite. A less amount in the range of from about 0.1 to about 10 wt. % will usually be preferred. The metal chelate component is generally composited with the support utilizing conventional techniques whereby the support, in the form of spheres, pills, pellets, granules or other particles of uniform or irregular size or shape, is soaked, suspended, dipped one or more times, or otherwise immersed in an aqueous or alcoholic impregnating solution and/or dispersion to adsorb a given quantity of the metal chelate component thereon. One preferred method involves the use of a steam-jacketed rotary dryer. The support is immersed in the impregnating solution and/or dispersion contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

In the process of sweetening a sour petroleum distillate, it is the practice to oxidize the mercaptans contained therein in the presence of an alkaline reagent. A supported mercaptan oxidation catalyst is typically initially saturated with the alkaline reagent, and the alkaline reagent is thereafter passed in contact with the catalyst bed, continuously or intermittently as required, admixed with the sour petroleum distillate. Any suitable alkaline reagent may be employed. An alkaline metal hydroxide in aqueous solution, e.g. sodium hydroxide in aqueous solution, is most often employed. The solution may further comprise a solubilizer to promote mercaptan solubility, e.g. alcohol, and especially methanol, ethanol, n-propanol, isopropanol, etc., and also phenyls, cresols, and the like. A particularly preferred alkaline reagent is an aqueous caustic solution comprising from about 2 to about 30 wt. % sodium hydroxide. The solubilizer, when employed, is preferably methanol, and the alkaline solution may suitably comprise from about 2 to about 100 vol. % thereof. Sodium hydroxide and potassium hydroxide constitute the preferred alkaline reagent, others including lithium hydroxide, rubidium hydroxide and cesium hydroxide are also suitably employed.

The treating process is usually effected at ambient temperature conditions, although higher temperatures up to about 105° C. are suitably employed. Pressures of up to about 1000 psi or more are operable, although atmospheric or substantially atmospheric pressures are entirely suitable. Contact times equivalent to a liquid hourly space velocity of from about 0.5 to about 10 or more are effected to achieve a desired reduction in the mercaptan content of a sour petroleum distillate, and optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The sour petroleum distillates commonly treated in contact with the described catalytic composite vary widely in composition depending on the source of the petroleum from which the distillate was derived, the boiling range of the distillate, and the method of processing the petroleum to produce the distillate. These differences largely determine the rate of catalyst deactivation as well as the extent to which the catalyst is deactivated. The differences include the character and concentration of the acidic and other non-hydrocarbon impurities, usually olefinic and phenolic materials, which occur in greater concentration in the higher boiling distillates. These impurities, while not necessarily adsorbed on the catalytic composite, in the state in which they exist in the distillates, are readily adsorbed in the higher oxidation state induced by the oxidation conditions of the treating process. The higher boiling distillates, for example kerosene, jet fuel, and the like, will further generally contain the more difficultly oxidized mercaptans, that is, the caustic insoluble, highly hindered branched chain and aromatic thiols, especially the higher molecular tertiary and polyfunctional mercaptans.

The method of this invention is of particular advantage with respect to the reactivation of the more difficultly reactivated catalysts, such as become deactivated in the treatment of the higher boiling sour petroleum distillates, or which have otherwise become deactivated beyond acceptable reactivation by conventional means.

Pursuant to the method of this invention, the catalytic composite can be reactivated in a one-step operation. It is preferred that prior to the reactivation operation, the catalytic composite be contacted with between about one and about three catalyst bed volumes of water of a temperature between about 50° C. and about 150° C. The purpose of the hot water treatment is to strip from the composite some of the hot water soluble materials which may have accumulated on the composite during its use. Such a preliminary water wash, while not necessary for the practice of the method of this invention, can enhance the ability of the method of this invention to reactivate a deactivated catalyst. The preliminary water wash can be accomplished by any conventional means, such as by allowing the water to flow down through a bed of the deactivated catalyst.

In the method of this invention, the catalytic composite is contacted with a quaternary ammonium compound and a linear ionic compound. The quaternary ammonium compounds herein contemplated include those compounds having four hydrocarbon radicals wherein each of said radicals comprises from 1 to about 20 carbon atoms, such as tetramethylammonium hydroxide, tetraethylammonium hydroxide, tetrapropylammonium hydroxide, tetrabutylammonium hydroxide, trimethylethylammonium hydroxide, trimethylpropylammonium hydroxide, trimethylbutylammonium hydroxide, dimethyldiethylammonium hydroxide, dimethyldipropylammonium hydroxide, dimethyldibutylammonium hydroxide, methyltriethylammonium hydroxide, methyltripropylammonium hydroxide, methyltributylammonium hydroxide, phenyltrimethylammonium hydroxide, phenyltriethylammonium hydroxide, phenyltripropylammonium hydroxide, phenyltributylammonium hydroxide benzyltrimethylammonium hydroxide, benzyltrimethylammonium hydroxide, benzyltripropylammonium hydroxide, benzyltributylammonium hydroxide, diphenyldimethylammonium hydroxide, diphenyldiethylammonium hydroxide, diphenyldipropylammonium hydroxide, diphenyldibutylammonium hydroxide, dibenzyldimethylammonium hydroxide, dibenzyldiethylammonium hydroxide, dibenzyldipropylammonium hydroxide, dibenzyldibutylammonium hydroxide, triphenylmethylammonium hydroxide, triphenylethylammonium hydroxide, triphenylpropylammonium hydroxide, triphenylbutylammonium hydroxide, and the like. Suitable anionic constituents include, in addition to the hydroxide ion, chloride, nitrate, nitrite, sulfate, phosphate, acetate, citrate, tartrate, and the like. Suitable anionic constituents include, in addition to the hydroxide ion, chloride, nitrate, nitrite, sulfate, phosphate, citrate, tartrate, and the like.

A preferred class of quaternary ammonium compounds is represented by the structural formula:

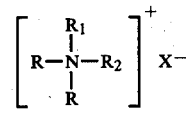

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, $R_2$ is selected from the group consisting of aryl, alkaryl and aralkyl, and X is an anion, for example, chloride, hydroxide, nitrate, nitrite, sulfate, phosphate, acetate, citrate, tartrate, and the like. $R_1$ is preferably an alkyl radical containing from about 12 to about 18 carbon atoms, $R_2$ is preferably benzyl, and X is preferably chloride or hydroxide. Preferred quaternary ammonium compounds thus include benzyldimethyldodecylammonium chloride, benzyldimethyltetradecylammonium chloride, benzyldimethylhexadecylammonium chloride, benzyldimethyloctadecylammonium chloride, and the like. Other suitable quaternary ammonium compounds include phenyldimethylpentylammonium chloride, phenyldipropylpentylammonium chloride, phenyldimethylhexylammonium chloride, phenyldiethylhexylammonium chloride, phenyldipropylhexylammonium chloride, phenyldimethyloctylammonium chloride, phenyldiethyloctylammonium chloride, phenyldipropyloctylammonium chloride, phenyldimethyldecylammonium chloride, phenyldiethyldecylammonium chloride, phenyldipropyldecylammonium chloride, phenyldimethyldodecylammonium chloride, phenyldiethyldodecylammonium chloride, phenyldipropyldodecylammonium chloride, phenyldimethyltetradecylammonium chloride, phenyldiethyltetradecylammonium chloride, phenyldipropyltetradecylammonium chloride, phenyldimethylhexadecylammonium chloride, phenyldiethylhexadecylammonium chloride, phenyldipropylhexadecylammonium chloride, phenyldimethyloctadecylammonium chloride, phenyldiethyloctadecylammonium chloride, phenyldipropyloctadecylammonium chloride, phenyldimethyleicosylammonium chloride, phenyldiethyleicosylammonium chloride, phenyldipropyleicosylammonium chloride, naphthyldimethylpentylammonium chloride, naphthyldiethylpentylammonium chloride, naphthyldipropylpentylammonium chloride, naphthyldimethylhexylammonium chloride, naphthyldiethylhexylammonium chloride, naphthyldipropylhexylammonium chloride, naphthyldimethyloctylammonium chloride, naphthyldiethyloctylammonium chloride, naphthyldipropyloctylammonium chloride, naphthyldimethyldecylammonium chloride, naphthyldiethyldecylammonium chloride, naphthyldipropyldecylammonium chloride, naphthyldimethyldodecylammonium chloride, naphthyldiethyldodecylammonium chloride, naphthyldipropyldodecylammonium chloride, naphthyldimethyltetradecylammonium chloride, naphthyldiethyltetradecylammonium chloride, naphthyldipropyltetradecylammonium chloride, naphthyldimethylhexadecylammonium chloride, naphthyldiethylhexadecylammonium chloride, naphthyldipropylhexadecylammonium chloride, naphthyldimethyloctadecylammonium chloride, naphthyldiethyloctadecylammonium chloride, naphthyldipropyloctadecylammonium chloride, benzyldimethylpentylammonium chloride, benzyldiethylpentylammonium chloride, benzyldipropylpentylammonium chloride, benzyldimethylhexylammonium chloride, benzyldiethylhexylammonium chloride, benzyldipropylhexylammonium chloride, benzyldimethyloctylammonium chloride, benzyldiethyloctylammonium chloride, benzyldipropyloctylammonium chloride, benzyldimethyldecylammonium chloride, benzyldiethyldecylammonium chloride, benzyldipropyldecylammonium chloride, benzyldiethyldodecylammonium chloride, benzyldipropyldodecylammonium chloride, benzyldiethyltetradecylammonium chloride, benzyldipropyltetradecylammonium chloride, benzyldiethylhexadecylammonium chloride, benzyldipropylhexadecylammonium chloride, benzyldiethyloctadecylammonium chloride, benzyldipropyloctadecylammonium chloride, benzyldimethyleicosylammonium chloride, benzyldiethyleicosylammonium chloride, benzyldipropyleicosylammonium chloride, tolyldimethylpentylammonium chloride, tolyldiethylpentylammonium chloride, tolyldipropylpentylammonium chloride, tolyldimethylhexylammonium chloride, tolyldiethylhexylammonium chloride, tolyldipropylhexylammonium chloride, tolyldimethyloctylammonium chloride, tolyldiethyloctylammonium chloride, tolyldipropyloctylammonium chloride, tolyldimethyldecylammonium chloride, tolyldiethyldecylammonium chloride, tolyldipropyldecylammonium chloride, tolyldimethyldodecylammonium chloride, tolyldiethyldodecylammonium chloride, tolyldipropyldodecylammonium chloride, tolyldimethyltetradecylammonium chloride, tolyldiethyltetradecylammonium chloride, tolyldipropyltetradecylammonium chloride, tolyldimethylhexadecylammonium chloride, tolyldiethylhexadecylammonium chloride, tolyldipropylhexadecylammonium chloride, tolyldimethyloctadecylammonium chloride, tolyldiethyloctadecylammonium chloride, tolyldipropyloctadecylammonium chloride, tolyldimethyleicosylammonium chloride, tolyldiethyleicosylammonium chloride, tolyldipropyleicosylammonium chloride, diphenylmethylpentylammonium chloride, diphenylethylpentylammonium chloride, diphenylpropylpentylammonium chloride, diphenylmethylhexylammonium chloride, diphenylethylhexylammonium chloride, diphenylpropylhexylammonium chloride, diphenylmethyloctylammonium chloride, diphenylethyloctylammonium chloride, diphenylpropyloctylammonium chloride, diphenylmethyldecylammonium chloride, diphenylethyldecylammonium chloride, diphenylpropyldecylammonium chloride, diphenylmethyldodecylammonium chloride, diphenylethyldodecylammonium chloride, diphenylpropyldodecylammonium chloride, diphenylmethyltetradecylammonium chloride, diphenylethyltetradecylammonium chloride, diphenylpropyltetradecylammonium chloride, diphenylmethylhexadecylammonium chloride, diphenylethylhexadecylammonium chloride, diphenylpropylhexadecylammonium chloride, diphenylmethyloctadecylammonium chloride, diphenylethyloctadecylammonium chloride, diphenylpropyloctadecylammonium chloride, diphenylmethyleicosylammonium chloride, diphenylethyleicosylammonium chloride, diphenylpropyleicosylammonium chloride, as well as the corresponding fluoride, bromide, iodide, hydroxide, sulfate, nitrate, nitrite, phosphate, acetate, citrate and tartrate compounds. In any case, the selected quaternary ammonium compound is suitably effective in aqueous solution in a concentration of from about 0.01 to about 10 wt. %.

The linear ionic compounds of the method of this invention comprise straight chain compounds which dissociate to some degree in aqueous solution into cationic and anionic constituents. The anionic constituent preferably comprises an unbranched hydrocarbon having from about 9 to about 24 carbon atoms. The anionic constituent more preferably comprises a substantially saturated unbranched hydrocarbon having from about 9 to about 24 carbon atoms. It is especially preferred that the anionic constituent also comprise a sulfonate group, a sulfate group, or a carboxylate group. The cationic constituent may be any convenient cation. The linear ionic compound selected should be sufficiently soluble in aqueous solution to permit the formation of an aqueous solution comprising the selected linear ionic compound in a concentration of from about 0.001 wt. % to about 10 wt. %. The preferred cationic constituents are the alkali metals and ammonium. Especially preferred is sodium.

Representative of saturated linear ionic compounds which can produce satisfactory results in the method of this invention are sodium nonyl sulfate, sodium nonyl sulfonate, sodium nonyl carboxylate, sodium decyl sulfate, sodium decyl sulfonate, sodium decyl carboxylate, sodium undecyl sulfate, sodium undecyl sulfonate, sodium undecyl carboxylate, sodium dodecyl sulfate, sodium dodecyl sulfonate, sodium dodecyl carboxylate, sodium tridecyl sulfate, sodium tridecyl sulfonate, sodium tridecyl carboxylate, sodium tetradecyl sulfate, sodium tetradecyl sulfonate, sodium tetradecyl carboxylate, sodium pentadecyl sulfate, sodium pentadecyl sulfonate, sodium pentadecyl carboxylate, sodium hexadecyl sulfate, sodium hexadecyl sulfonate, sodium hexadecyl carboxylate, sodium heptadecyl sulfate, sodium heptadecyl sulfonate, sodium heptadecyl carboxylate, sodium octadecyl sulfate, sodium octadecyl sulfonate, sodium octadecyl carboxylate, sodium nonadecyl sulfate, sodium nonadecyl sulfonate, sodium nonadecyl carboxylate, sodium eicosyl sulfate, sodium eicosyl sulfonate, sodium eicosyl carboxylate, sodium heneicosyl sulfate, sodium heneicosyl sulfonate, sodium heneicosyl carboxylate, sodium docosyl sulfate, sodium docosyl sulfonate, sodium docosyl carboxylate, sodium tricosyl sulfate, sodium tricosyl sulfonate, sodium tricosyl carboxylate, sodium tetracosyl sulfate, sodium tetracosyl sulfonate, and sodium tetracosyl carboxylate. As indicated above, cationic constituents such as ammonium and alkali metals other than sodium can provide satisfactory results. The preferred ionic compound is sodium dodecyl sulfate, commonly known as sodium lauryl sulfate.

Representative of unsaturated linear ionic compounds which can produce satisfactory results in the method of this invention are sodium nonenyl sulfate, sodium nonynl sulfate, sodium nonadienyl sulfate, sodium decenyl sulfate, sodium decynl sulfate, sodium decadienyl sulfate, sodium undecenyl sulfate, sodium undecynl sulfate, sodium undecadienyl sulfate, sodium dodecenyl sulfate, sodium dodecynl sulfate, sodium dodecadienyl sulfate, sodium tridecenyl sulfate, sodium tridecynl sulfate, sodium tridecadienyl sulfate, sodium tetradecenyl sulfate, sodium tetradecynl sulfate, sodium tetradienyl sulfate, sodium pentadecenyl sulfate, sodium pentadecynl sulfate, sodium pentadienyl sulfate, sodium hexadecenyl sulfate, sodium hexadecynl sulfate, sodium hexadienyl sulfate, sodium heptadecenyl sulfate, sodium heptadecynl sulfate, sodium heptadienyl sulfate, sodium octadecenyl sulfate, sodium octadecynl sulfate, sodium octadienyl sulfate, sodium nonadecenyl sulfate, sodium nonadecynl sulfate, sodium nonadienyl sulfate, sodium eicosadecenyl sulfate, sodium eicosadecynl sulfate, sodium eicosadienyl sulfate, sodium heneicosadecenyl sulfate, sodium heneicosadecynl sulfate, sodium heneicosadienyl sulfate, sodium docosadecenyl sulfate, sodium docosadecynl sulfate, sodium docosadienyl sulfate, sodium tricosadecenyl sulfate, sodium tricosadecynl sulfate, sodium tricosadienyl sulfate, sodium tetracosadecenyl sulfate, sodium tetracosadecynl sulfate, and sodium tetracosadienyl sulfate. Other unsaturated linear ionic compounds which can produce satisfactory results include the sulfonate and carboxylate analogues of the foregoing sulfates. Cationic constituents such as ammonium and alkali metals other than sodium can provide satisfactory results.

The linear ionic compounds are easily prepared by well known methods from several precursors, including alcohols, acids, and olefins. For example, a linear carboxylate salt can be prepared from the analogous carboxylic acid, which itself is commonly prepared from animal and vegetable fats. Thus, sodium laurate is formed by the reaction of lauric acid and sodium hydroxide. Linear sulfates can be prepared by the reaction of sulfuric acid with the corresponding olefin or alcohol. Thus, lauryl alcohol reacts with sulfuric acid to form lauryl hydrogen sulfate, which can be neutralized with sodium hydroxide to form sodium lauryl sulfate. Similarly, the reaction of the corresponding olefin with sulfuric acid produces the hydrogen sulfate, which can be neutralized to the sodium sulfate compound. The sulfonate can be prepared by the reaction of sulfuric acid with the corresponding alkane, to produce a sulfonic acid which can be neutralized to a sulfonate salt. Alternatively, an alkyl sulfonic acid can be neutralized with sodium hydroxide to form the corresponding sodium alkyl sulfonate. Still another alternative is the sulfonation of an alkyl halide to form the desired compound.

The contacting of the catalytic composite with the quaternary ammonium compound and the linear ionic compound can be performed concurrently by use of a common solution or sequentially by use of separate solutions. Satisfactory results should be obtained by either mode. The contacting is preferably, although not necessarily, effected in situ, with the catalytic composite disposed as a fixed bed in the treating column in which it has been used in the mercaptan oxidation process. Sufficient of the solution or solutions of linear ionic compound and quaternary ammonium compound can be charged and retained in the treating column to immerse the catalyst bed for a period of from about 2 to about 48 hours or more under quiescent conditions, provided that the treating column embodies the necessary heating means. It is a preferred practice to effect a continuous circulation of the solution or solutions through the treating column in contact with the deactivated catalytic composite, the quaternary ammonium compound solution being recycled to the column through an external heating means. Regardless of the particular method used to contact the catalytic composite with the quaternary ammonium compound and the linear ionic compound, the optimal contact time will be the time necessary for equilibrium to be established between the concentration of quaternary ammonium compound and linear ionic compound in solution and the concentration of quaternary ammonium compound and linear ionic compound disposed on the catalytic composite.

The temperature of the solution of quaternary ammonium compound is important to the method of this invention. The temperature should be below the temperature of thermal decomposition of the particular quaternary ammonium compound selected. The temperature should be high enough to yield a satisfactory reactivated catalytic composite. While the mechanism of reactivation is not completely understood, it is believed that the advantageous results arising from the method of this invention are a result in part of the interaction of the quaternary ammonium compound and linear ionic compound with the metal chelate. It is further believed that conducting contacting at a temperature within the range hereinabove specified facilitates that interaction. It is preferred to conduct the contacting at a temperature of from about 90° C. to about 110° C.

The total amount of quaternary ammonium compound and linear ionic compound in the solution or solutions is a function of the amount of quaternary ammonium compound and linear ionic compound desired to be disposed on the catalytic composite. Advantageous results in the practice of the method of this invention can be achieved when the amount of quaternary ammonium compound in the aqueous solution is from about 0.1 wt. % to about 1 wt. % relative to the amount of catalytic composite being contacted with the solution, and the amount of linear ionic compound in the solution is from about 0.01 wt. % to about 1 wt. % relative to the amount of catalytic composite being contacted with the solution.

Deactivation of catalytic composites is believed to arise in some circumstances from a partial loss of availability of the metal chelate component of the composite.

Such a loss of availability may be due to the desorption of the metal chelate component from the composite during the treating operation, to the deposition of gums, polymeric compounds, or other substances on the composite thereby preventing effective contacting of the metal chelate with mercaptans contained in the distillate being treated, or a combination of such causes. In circumstances in which such a loss of availability has occurred, it is advantageous to contact the catalytic composite with a solution of a metal chelate during the reactivation process. Such contacting of the catalytic composite with a metal chelate can be performed prior to the contacting of the catalytic composite with the quaternary ammonium compound and the linear ionic compound, or simultaneously therewith. Thus, one embodiment of the method of this invention is a two-step sequential contacting process, the first step comprising contacting the catalytic composite to be reactivated with an aqueous ammoniacal solution of a metal chelate, and the second step comprising the contacting of the catalytic composite with an aqueous solution of a quaternary ammonium compound and a linear ionic compound at a temperature of from about 55° C. to about 175° C.

Similarly, another embodiment of the method of this invention is a two-step sequential contacting process, wherein the first step comprises contacting the catalytic composite to be reactivated with an aqueous ammoniacal solution, of a metal chelate and a linear ionic compound, and the second step comprises contacting the catalytic composite with an aqueous solution of a quaternary ammonium compound at a temperature of from about 55° C. to about 175° C. A third embodiment of the method of this invention is a single-step contacting process in which the catalytic composite to be reactivated is contacted with an aqueous ammoniacal solution of a metal chelate, a linear ionic compound, and a quaternary ammonium compound, at a temperature of from about 55° C. to about 175° C. The metal chelate used in the foregoing embodiments of this invention can be any of the metal chelates indicated hereinabove. Preferred metal chelates are metal phthalocyanines. Of the metal phthalocyanines, cobalt phthalocyanine and vanadium phthalocyanine are preferred. Cobalt phthalocyanine monosulfonate, cobalt phthalocyanine disulfonate, or a mixture thereof, are particularly preferred. It is not necessary to this invention that the metal chelate employed in the practice of the method of this invention be the same metal chelate which was disposed on the carrier during the preparation of the catalytic composite. The reaction mechanism by which a mercaptan oxidation catalyst promotes the oxidation of mercaptan sulfur to disulfides is not fully understood. It appears that a freshly prepared catalytic composite and a reactivated catalytic composite of the same constituents behave in substantially the same manner in oxidizing mercaptan sulfur. For this reason, the metal chelates indicated hereinabove as preferred in the preparation of a mercaptan oxidation catalytic composite are the same metal chelates which are preferred for use in the practice of the method of this invention.

Metal chelates are not as easily disposed on the deactivated catalytic composite as they are on the carrier material during preparation of the catalytic composite. In addition, disposition of metal chelates on a deactivated mercaptan oxidation catalyst may result in a distribution of metal chelates on the catalytic composite which is different than the distribution of metal chelates on a catalytic composite which has not been used in a mercaptan oxidation reaction. The aqueous ammoniacal solution of the metal chelate employed in the method of this invention is dilute with respect to both the metal chelate and the ammonium hydroxide concentration. It is preferred that the metal chelate comprise from about 0.01 wt. % to about 1 wt. % of the solution. It is especially preferred that the metal chelate comprise from about 0.01 wt. % to about 0.2 wt. % of the solution. It is preferred that the ammonium hydroxide comprise from about 0.1 wt. % to about 5 wt. % of the solution. It is especially preferred that the ammonium hydroxide comprise from about 0.1 wt. % to about 1 wt. % of the solution.

In embodiments of this invention wherein the linear ionic compound is present in a common solution with the metal chelate, the linear ionic compound can be advantageously employed in said solution in a concentration of from about 0.001 wt. % to about 10 wt. %. In embodiments of this invention wherein the quaternary ammonium compound is present in a common solution with the metal chelate, the quaternary ammonium compound can be advantageously employed in said solution in a concentration of from about 0.01 wt. % to about 10 wt. %.

The temperature of the aqueous ammoniacal solution of the metal chelate is not critical to the method of this invention. It is preferred as a matter of convenience to conduct the contacting of the catalytic composite and the metal chelate at from about 20° C. to about 150° C. However, as stated previously, the temperature of the solution of quaternary ammonium compound is important to the method of this invention. Therefore, in the embodiments of this invention wherein the metal chelate and the quaternary ammonium compound are present in common solution, the temperature of that solution should be from about 55° C. to about 175° C.

The contacting of the catalytic composite and the metal chelate is preferably, although not necessarily, effected in situ, that is, with the catalytic composite disposed as a fixed bed in the treating column in which it has been used in the mercaptan oxidation process. Sufficient of the aqueous ammoniacal solution of a metal chelate can be charged and retained in the treating column to immerse the catalyst bed for a period of from about 2 to about 48 hours or more under quiescent conditions. It is a preferred practice to effect a continuous circulation of the solution through the treating column in contact with the deactivated catalytic composite. Satisfactory results can be obtained with a contact time of from about 2 hours to about 48 hours. Regardless of the particular method used to contact the solution with the catalytic compounds, the optimal contact time will be the time necessary for equilibrium to be established between the concentration of metal chelate in solution and the concentration of metal chelate disposed on the catalytic composite.

The total amount of the metal chelate in the aqueous ammoniacal solution is a function of the amount of metal chelate desired to be disposed on the catalytic composite. Although up to about 25 wt. % metal chelate can be disposed on a carrier and still form a stable catalytic composite, the total amount of metal chelate which can be disposed on a deactivated catalytic composite is somewhat less. The deactivation process of a mercaptan oxidation catalyst is not fully understood. The deactivation occurs for reasons in addition to mere loss, by leaching or otherwise, of metal chelate from the composite. Thus, a simple replacement of the metal chelate does not produce a satisfactorily active and stable catalyst. Satisfactory reactivation can be accomplished by the method of this invention when the amount of metal chelate in the aqueous ammoniacal solution is from about 0.1 wt. % to about 1 wt. % relative to the amount of catalytic composite being contacted with the metal chelate solution.

The following examples are presented in illustration of a certain preferred embodiment of this invention and are not intended as an undue limitation on the generally broad scope of the invention as set out in the appended claims.

EXAMPLE I

This example illustrates the reactivation of a catalytic composite using hot water and a quaternary ammonium compound. In this example, a mercaptan oxidation catalyst, deactivated in a kerosene treating process, was evaluated with respect to a sour petroleum distillate—a kerosene fraction having an endboiling point of 503° F. and containing 505 ppm by weight mercaptan sulfur. The catalyst originally consisted of about 0.5 wt. % cobalt phthalocyanine monosulfonate and about 18 wt. % quaternary ammonium chloride, disposed on 10–30 mesh activated charcoal particles of an apparent bulk density of about 0.25 gm/cc. The kerosene was charged downflow through 100 cc of the deactivated catalyst disposed as a fixed bed in a vertical tubular reactor, the kerosene being charged at a liquid hourly space velocity of about 0.5 under 45 psig of air—sufficient to provide about 1.5 times the stoichiometric amount of oxygen required to oxidize the mercaptans contained in the kerosene. The catalyst bed was initially flushed with about 600 cc of water at about 100° C., and thereafter wetted with about 10 cc of an 8 wt. % aqueous caustic solution, 10 cc of said solution being subsequently charged to the catalyst bed at about 12 hour intervals admixed with the kerosene charged thereto. The treated kerosene was analyzed periodically for mercaptan sulfur. After about 300 hours on stream, the treated kerosene continued to display about 50 ppm mercaptan sulfur upon analysis. At this stage, 600 cc of hot (75° C.) water containing 0.25 gm of mixed benzyldimethylalkylammonium hydroxides, wherein the alkyl substituent was a straight chain $C_{12}$–$C_{18}$ alkyl substituent, was charged downflow through the catalyst bed. After this reactivation treatment, the kerosene was analyzed to contain about 20 ppm mercaptan sulfur continuing over the subsequent 175 hours on stream.

EXAMPLE II

This example illustrates a sequential reactivation of a catalytic composite using hot water, cobalt phthalocyanine in aqueous ammoniacal solution, and a quaternary ammonium compound in a hot aqueous solution. In this example, a mercaptan oxidation catalyst, deactivated in a kerosene treating process, was evaluated with respect to a sour kerosene fraction having an endboiling point of 486° F. and containing 873 ppm by weight mercaptan sulfur. The catalyst originally consisted of about 0.5 wt. % cobalt phthalocyanine monosulfonate and about 18 wt. % quaternary ammonium chloride, disposed on 10–30 mesh activated charcoal particles of an apparent bulk density of about 0.25 gm/cc. The kerosene was charged downflow through 100 cc of the deactivated catalyst disposed as a fixed bed in a vertical tubular reactor, the kerosene being charged at a liquid hourly space velocity of about 0.5 under 70 psig of air—sufficient to provide about 1.5 times the stoichiometric amount of oxygen required to oxidize the mercaptans contained in the kerosene. The catalyst bed was initially flushed with about 600 cc of water at about 100° C. Thereafter, 125 cc of a solution comprising 0.15 gm of commercial grade (about 85% purity) monosulfonated cobalt phthalocyanine, 1 cc of 28 wt. % aqueous ammonia, and the balance deionized water, was charged downflow through the catalyst bed, and recycled until it lost substantially all of its color. Thereafter, about 600 cc of a solution comprising 0.25 gm of mixed benzyldimethylalkylammonium hydroxides, wherein the alkyl substituent was a straight chain $C_{12}$–$C_{18}$ alkyl substituent, in water at a temperature of about 100° C., was charged downflow through the catalyst bed. The catalyst bed was wetted with about 10 cc of a 7 wt. % aqueous caustic solution, 10 cc of said solution being subsequently charged to the catalyst bed at about 12 hour intervals admixed with the kerosene charged thereto. The kerosene was analyzed for mercaptan content periodically over the subsequent 200 hours on stream. During that 200 hour period, the mercaptan content of the treated kerosene stream averaged about 8 ppm by weight. At the end of the 200 hour period, the mercaptan content of the treated kerosene was about 12 ppm by weight.

EXAMPLE III

This example illustrates the reactivation of a catalytic composite using the method of Example II, except that the aqueous ammoniacal solution of cobalt phthalocyanine also contains lauryl sulfate. This example also illustrates one embodiment of the method of this invention. In this example, a mercaptan oxidation catalyst, deactivated in a kerosene treating process, was evaluated with respect to a sour kerosene fraction having an endboiling point of 486° F. and containing 873 ppm by weight mercaptan sulfur. The catalyst originally consisted of about 0.5 wt. % cobalt phthalocyanine monosulfonate and about 18 wt. % quaternary ammonium chloride, disposed on 10–30 mesh activated charcoal particles of an apparent bulk density of about 0.25 gm/cc. The kerosene was charged downflow through 100 cc of the deactivated catalyst disposed as a fixed bed in a vertical tubular reactor, the kerosene being charged at a liquid hourly space velocity of about 0.5 under 70 psig of air—sufficient to provide about 1.5 times the stoichiometric amount of oxygen required to oxidize the mercaptans contained in the kerosene. The catalyst bed was initially flushed with about 600 cc of water at about 100° C. Thereafter, 125 cc of a solution comprising 0.15 gm of commercial grade (about 85% purity) monosulfonated cobalt phthalocyanine, 0.05 gm of sodium lauryl sulfate, 1 cc of 28 wt. % aqueous ammonia, and the balance deionized water, was charged downflow through the catalyst bed, and recycled until it lost substantially all of its color. Thereafter, about 600 cc of a solution comprising 0.25 gm of mixed benzyldimethylalkylammonium hydroxides, wherein the alkyl substituent was a straight chain $C_{12}$–$C_{18}$ alkyl substituent, in water at a temperature of about 100° C., was charged downflow through the catalyst bed. The catalyst bed was wetted with about 10 cc of a 7 wt. % aqueous caustic solution, 10 cc of said solution being subsequently charged to the catalyst bed at about 12 hour intervals admixed with the kerosene charged thereto. The kerosene was analyzed for mercaptan content periodically over the subsequent 200 hours on stream. During that 200 hour period, the mercaptan content of the treated kerosene stream averaged about 3 ppm by weight. At the end of the 200 hour period, the mercaptan content of the treated kerosene was about 9 ppm by weight.

EXAMPLE IV

This example illustrates the activity of the catalytic composite of Example II using only a hot water regeneration. In this example, the mercaptan oxidation catalyst of Example II, deactivated in a kerosene treating process, was evaluated with respect to a sour kerosene fraction having an end-boiling point of 486° F. and containing 873 ppm by weight mercaptan sulfur. The catalyst originally consisted of about 0.5 wt. % cobalt phthalocyanine monosulfonate and about 18 wt. % quaternary ammonium chloride, disposed on 10-30 mesh activated charcoal particles of an apparent bulk density of about 0.25 gm/cc. The kerosene was charged downflow through 100 cc of the deactivated catalyst disposed as a fixed bed in a vertical tubular reactor, the kerosene being charged at a liquid hourly space velocity of about 0.5 under 70 psig of air—sufficient to provide about 1.5 times the stoichiometric amount of oxygen required to oxidize the mercaptans contained in the kerosene. The catalyst bed was initially flushed with about 600 cc of water at about 100° C., and thereafter wetted with about 10 cc of a 7 wt. % aqueous caustic solution, 10 cc of said solution being subsequently charged to the catalyst bed at about 12 hour intervals admixed with the kerosene charged thereto. The treated kerosene was analyzed periodically for mercaptan sulfur. At the beginning of the treating operation, the treated kerosene was analyzed to contain about 40 ppm by weight of mercaptan sulfur. At the end of the 200 hour run, the treated kerosene was analyzed to contain about 44 ppm by weight mercaptan sulfur.

The results of the tests of the foregoing examples are summarized in the following Table. Columns I, II, III and IV correspond to Examples I, II, III and IV.

TABLE

| | I. | II. | III. | IV. |
|---|---|---|---|---|
| Reactivation procedure | water; quat. compound | water; phthalocyanine in aqueous ammoniacal solution; quat. compound | water; phthalocyanine in aqueous ammoniacal solution with lauryl sulfate; quat. compound | none |
| Mercaptan content, Wt. ppm | | | | |
| Charge | 505 | 873 | 873 | 873 |
| Product | | | | |
| Before reactivation | 50 | 40 | 40 | 40 |
| End of run | 20 | 12 | 5 | 44 |
| Periods of runs, hrs. | 175 | 200 | 200 | 200 |

The foregoing examples show that reactivation of a deactivated catalytic composite comprising an adsorptive carrier and a metal chelate can be very effectively accomplished by the method of this invention. It is believed that the deactivation process occurring during a mercaptan treating operation results in part from the removal or inactivation of constituents originally disposed on the support material. In these examples, it is believed that the deactivated catalyst comprises substantially no quaternary ammonium compound. Example III, an example illustrating one embodiment of the method of this invention, shows that reactivation in accordance with the method of this invention increased by more than 87% the ability of a catalytic composite to reduce the mercaptan sulfur level of a very sour petroleum distillate. The reactivated catalytic composite was able to reduce the mercaptan sulfur content of a petroleum distillate from 873 ppm by weight to 5 ppm by weight after 200 hours of use. Example IV, a control example, shows that without reactivation the catalytic composite used in Example III was much less effective, reducing the mercaptan sulfur content of a petroleum distillate from 873 ppm by weight to 44 ppm by weight after 200 hours of use. Example I shows the results of reactivation without use of an aqueous ammoniacal solution of a metal chelate or of lauryl sulfate. Although the sour petroleum distillate treated during the 175 hour run after reactivation was of a substantially lower mercaptan sulfur content (505 wt. ppm) than the sour petroleum distillate of Example III (873 wt. ppm), the reactivation of Example I was not as effective as the reactivation of Example III. Example II illustrates the use of a reactivation method substantially similar to the embodiment of the method of this invention illustrated in Example III, except that no lauryl sulfate was used in the method of Example II. This comparison, especially, shows the advantage of the method of this invention. The method of this invention is clearly a superior method of reactivating a catalytic composite.

I claim as my invention:

1. A method of reactivating a deactivated mercaptan oxidation catalytic composite comprising a carrier material and a metal chelate, said method comprising contacting said composite at a temperature of between about 55° C. and about 175° C. with an aqueous solution of a quaternary ammonium compound and a saturated linear ionic compound having from about 9 to about 24 carbon atoms.

2. The method of claim 1 wherein said carrier material is an activated charcoal.

3. The method of claim 1 wherein said quaternary ammonium compound is represented by the structural formula:

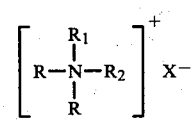

wherein R is a hydrocarbon radical containing up to about 20 carbon atoms and selected from the group consisting of alkyl, cycloalkyl, aryl, alkaryl, and aralkyl, $R_1$ is a substantially straight chain alkyl radical containing from about 5 to about 20 carbon atoms, $R_2$ is selected from the group consisting of aryl, aralkyl and alkaryl, and X is an anion.

4. The method of claim 1 wherein said quaternary ammonium compound is a benzyldimethylalkylammonium hydroxide wherein the alkyl substituent is a substantially straight chain alkyl radical containing from about 5 to about 20 carbon atoms.

5. The method of claim 1 wherein said quaternary ammonium compound is a benzyldimethylalkylammonium hydroxide wherein the alkyl substituent is a substantially straight chain alkyl radical containing from about 12 to about 18 carbon atoms.

6. The method of claim 1 wherein said quaternary ammonium compound is selected from the group consisting of benzyldimethyldodecylammonium hydroxide, benzyldimethyltetradecylammonium hydroxide, benzyldimethylhexadecylammonium hydroxide, and benzyldimethyloctadecylammonium hydroxide.

7. The method of claim 1 wherein said linear ionic compound possesses an anionic portion wherein said anionic portion is selected from the group consisting of sulfonate, sulfate and carboxylate.

8. The method of claim 7 wherein said linear ionic compound possesses a cationic portion wherein said cationic portion is selected from the group consisting of alkali metals and ammonium.

9. The method of claim 1 wherein said linear ionic compound is selected from the group consisting of sodium undecyl sulfate, sodium dodecyl sulfate and sodium tridecyl sulfate.

10. The method of claim 1 wherein the concentration of said quaternary ammonium compound in said aqueous solution is from about 0.01 wt. % to about 10 wt. %.

11. The method of claim 1 wherein the concentration of said linear ionic compound in said aqueous solution is from about 0.001 wt. % to about 10 wt. %.

12. The method of claim 1 wherein said contacting step is carried out at a temperature of from about 90° C. to about 110° C.

13. A method of reactivating a deactivated mercaptan oxidation catalytic composite comprising an adsorptive carrier material and a metal chelate, said method comprising the steps of first contacting said composite with an aqueous ammoniacal solution of said metal chelate, or a different metal chelate, and second contacting said composite with an aqueous solution of a quaternary ammonium compound and a saturated linear ionic compound having between about 9 and about 24 carbon atoms at a temperature of from about 55° C. to about 175° C.

* * * * *